Jan. 11, 1938.  F. L. SCOTT  2,104,820
THREE CUTTER DRILL
Filed Dec. 20, 1935

F. L. SCOTT
INVENTOR

BY Jesse R. Stone
ATTORNEY

Patented Jan. 11, 1938

2,104,820

UNITED STATES PATENT OFFICE 2,104,820

THREE-CUTTER DRILL

Floyd L. Scott, Houston, Tex.

Application December 20, 1935, Serial No. 55,371

6 Claims. (Cl. 255—71)

My invention relates to roller boring drills such as are employed in drilling deep wells for oil, gas, water and the like.

It has particular application to drills where the cutters are mounted on inwardly and downwardly extending cutter shafts which are unsupported at their lower ends.

It is an object of the invention to provide a drill of the character stated in which the cutters are mounted and shaped to effectively cut the full bottom of the hole.

I desire to cover not only the outer portion of the well bottom but to provide a cutter extending across the center of the hole and assure that no uncut bottom be left.

I also desire to provide cutters which will easily rotate and cut the bottom effectively with a combined rolling and scraping action.

Figure 1:
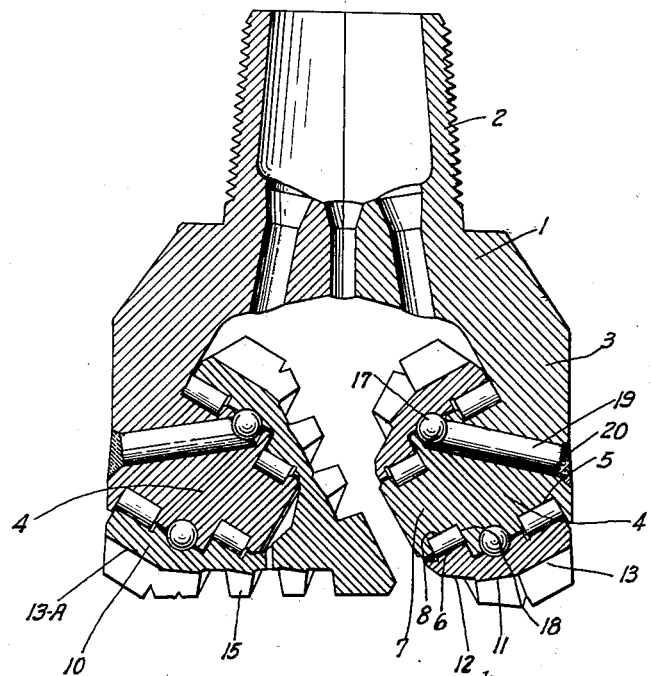
Figure 2:
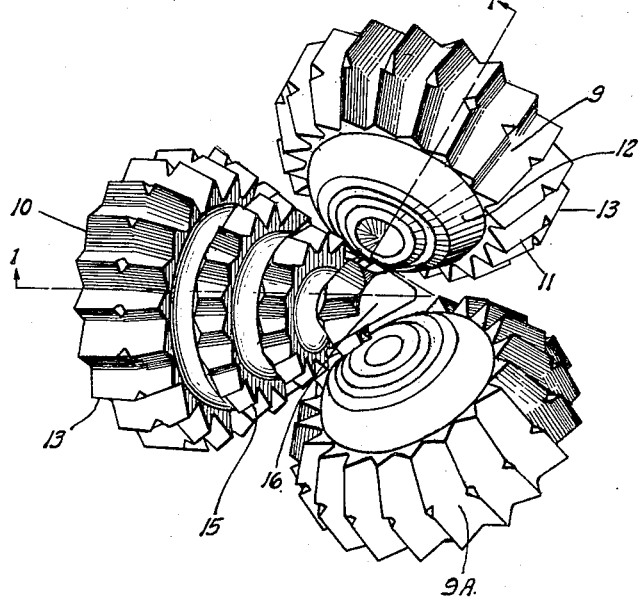

In the drawing herewith, Fig. 1 is a longitudinal section through a drill embodying the invention taken approximately on the broken plane 1—1 of Fig. 2.

Fig. 2 is a bottom plan view of the rolling cutters which I employ arranged in cutting position.

The cutters are mounted on a head 1 having an upper threaded shank 2 thereon for connection with a drill collar. Said head has three downwardly diverging legs 3 connected therewith. On each leg is an integral downwardly and inwardly inclined cutter shaft 4.

The cutter shafts are each similarly formed with a larger diameter base having a roller raceway 5 adjacent the head and a ball raceway 6 spaced inwardly therefrom. The smaller diameter end 7 of each shaft has a roller raceway 8 therein. There are two cutters 9 and 9ª of the same form and construction and a third cutter 10 of conical shape extended to cut the center of the hole.

The cutters 9 and 9ª are annular in shape and are formed on their inner faces to fit closely over the shaft and the anti-friction bearings thereon. The ends of the shafts 7 project slightly beyond the ends of the cutters 9, 9ª. The outer periphery of each cutter is approximately cylindrical at the base 13 and is tapered toward the end of the shaft at 11. These two areas are toothed to cut the outer portion of the well bottom as they are rolled off the formation by the rotation of the head. The inner end of each cutter 9, 9ª is untoothed and is rounded off at 12 toward the inner end of the shaft.

Each cutter is held on its shaft by the balls 17 in the raceway 6, which also engage in raceway 18 in the cutter. The balls are inserted into position in the raceways through a transverse opening in the head which opening is then closed by a cylindrical pin 19 held in place by a bond of welding material 20.

The third cutter 10 is shaped to fit over and enclose the end of the shaft 4 upon which it is mounted. It has bearings like those of the cutters 9, 9ª, just described. The outer periphery is formed approximately in the shape of an elongated cone. There is an approximately cylindrical area 13ª at the base but the larger part of the cutter tapers to an apex which extends beyond the axis of rotation of the drill. The forward portion of the conical cutter is provided with circumferential rows 15 of teeth. The apex of the cone also has teeth thereon, one portion being flattened on two sides at 16 to provide a scraping chisel edge to effectively cut at the center of the hole inside the tracks cut by the two outer cutters 9, 9ª.

As will be seen, the outer portion of the hole is cut by all three cutters. The smaller inner area is cut by the inner end of cutter 10. The teeth on this cutter extend across the geometrical center of the well bottom, and by cutting thereon assures the cutting of a full flat bottom without leaving any central uncut portion as sometimes is done in other types of drills. The teeth 15 and 16 on the conical cutter have a combined rolling and scraping action tending to effectively cut away the formation. The cylindrical outer areas at 13 on each cutter also cuts with a similar action. By the combination of cutters formed and mounted as here shown a most effective action is obtained in cutting away the bottom of the well so that the drill may advance. There is no uncut portion of the well to impede the action of the drill.

What I claim as new is:

1. A well drill including a head, a threaded shank thereon, three forwardly extending legs thereon, downwardly and inwardly extending shafts on said legs, said shafts being supported only at their outer ends, annular cutters mounted on two of said shafts to cut the outer portion of the hole only, and a third cutter of elongated conical shape, enclosing the end of its shaft and the smaller end of which extends between the two annular cutters, a toothed point thereon extending past the center of the hole, said cutters being toothed and acting together to cut the full bottom of the hole.

2. A well drill including a head, a threaded shank thereon, three forwardly extending legs thereon, downwardly and inwardly extending shafts on said legs, said shafts being supported only at their outer ends, annular cutters mounted on two of said shafts to cut the outer portion of the hole only, and a third cutter of elongated conical shape, enclosing the end of its shaft and the smaller end of which extends across the geometrical center of the hole and cuts the portion left uncut by said annular cutters.

3. A well drill having three downwardly and inwardly inclined cutter shafts, annular cutters on two of said shafts and exposing the inner ends of said shafts, a third cutter having an approximately conical shape and enclosing the end of the third of said shafts, said conical cutter extending across the center of the well bore, said cutter being toothed to cut the full bottom of the hole.

4. A well drill having three downwardly and inwardly inclined cutter shafts, annular cutters on two of said shafts and exposing the inner ends of said shafts, cutting teeth on the outer portions of said cutters the inner ends being rounded off toward the ends of said shafts, a third cutter having an approximately conical shape and enclosing the end of the third of said shafts, said conical cutter extending across the center of the well bore, said cutter being toothed to cut the full bottom of the hole.

5. A well drill head, a plurality of downwardly and inwardly inclined shafts thereon, a conical cutter surrounding the end of one of said shafts and projecting across the axial center of the drill, annular cutters mounted on the other shafts, said annular cutters being positioned to cut the outer portion of the well bottom.

6. A well drill head, a plurality of downwardly and inwardly inclined shafts thereon, a cutter surrounding and enclosing the end of one of said shafts and rotatable thereon, the outer surface of said cutter being toothed and tapered to converge beyond the axis of rotation of said drill head, a scraping point on said cutter extending across said axis, annular cutters mounted to rotate on the other of said shafts and to cut the outer portion of the well bottom.

FLOYD L. SCOTT.